T. C. YOUNG.
CORN-PLANTER.

No. 185,615. Patented Dec. 19, 1876.

WITNESSES:
H. Rydquist
John Goethals

INVENTOR:
T. C. Young
BY
Munn & Co.
ATTORNEYS.

THE GRAPHIC CO. N.Y.

UNITED STATES PATENT OFFICE

THOMAS C. YOUNG, OF ST. CHARLES, IOWA.

IMPROVEMENT IN CORN-PLANTERS.

Specification forming part of Letters Patent No. 185,615, dated December 19, 1876; application filed September 9, 1876.

*To all whom it may concern:*

Figure 1:
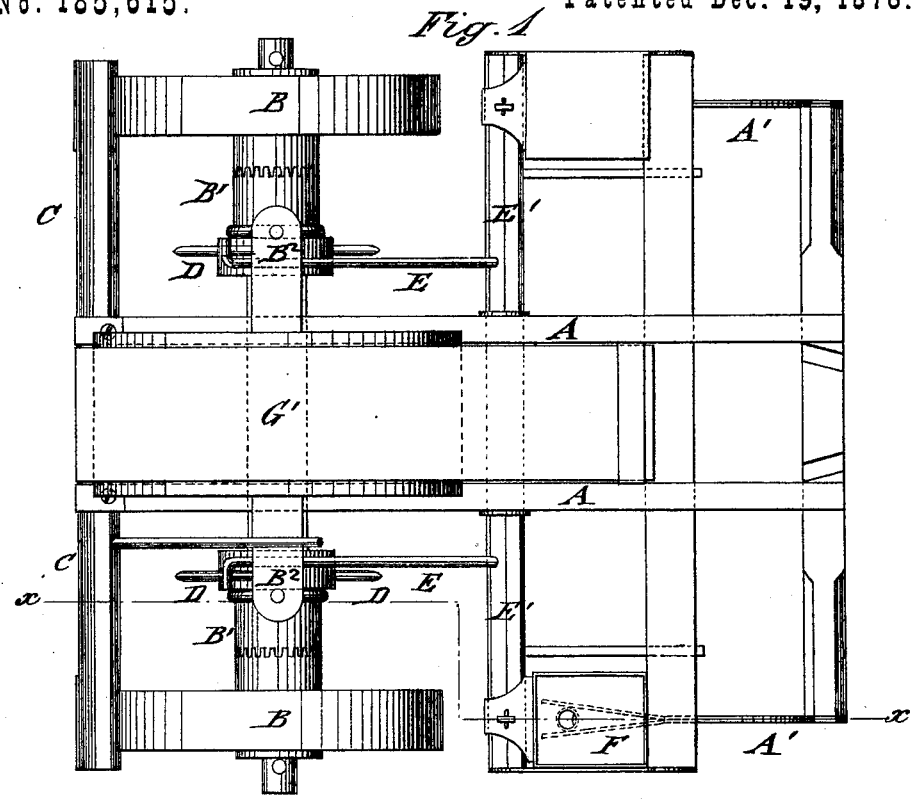
Figure 2:
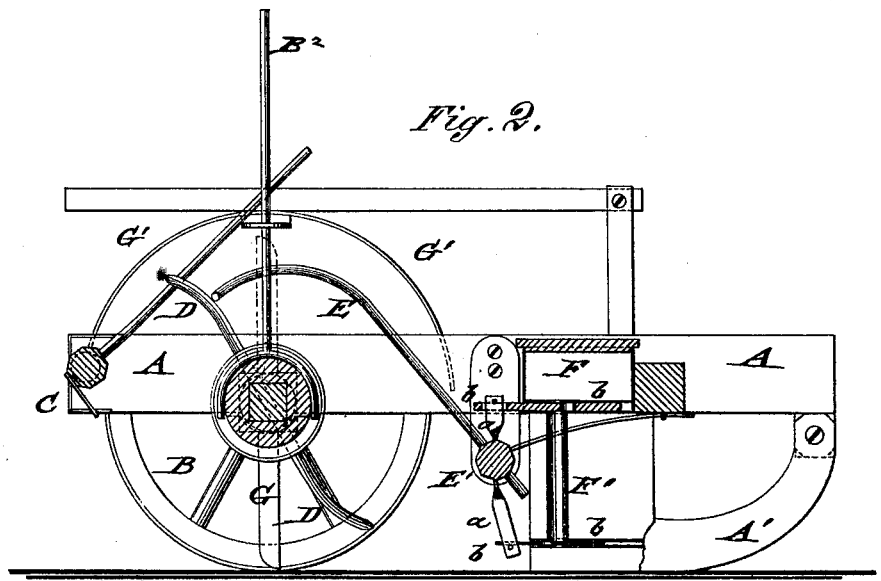

Be it known that I, THOMAS C. YOUNG, of St. Charles, county of Madison, and State of Iowa, have invented a new and Improved Corn-Planter, of which the following is a specification:

In the accompanying drawing, Figure 1 represents a plan view, and Fig. 2 a vertical longitudinal section, of my improved corn-planter.

Similar letters of reference indicate corresponding parts.

The invention will first be described in connection with the drawing, and then pointed out in the claim.

In the drawing, A represents the supporting-frame of my improved corn-marker, that is revolved by two horses and a driver. The supporting-frame A rests on broad hind wheels B, and on curved furrowing-pieces A', that are arranged in front of the seed-boxes. The wheels B are placed stationary on a square axle, and coupled or uncoupled by a clutch mechanism, B¹, that is moved along the axle by means of levers B², operated from the driver's seat. The seed-boxes F may be worked separately or jointly, according as one or both clutches B¹ are thrown into gear with the wheels. When one box only is required to drop, the opposite clutch mechanism is thrown out of gear, and when both are desired to be interrupted, for turning or otherwise, both clutches are thrown out of gear with the wheels. To the sliding sleeve, operated by the lever B², are applied diametrically-extending arms D, that curve at the outer ends. These arms D revolve with the axle when the clutch is thrown into gear, and engage the rectangularly-bent ends of the curved rods E of a rock-shaft, E', so as to raise and drop the same, and operate thereby, by fixed diametrical arms a, the top and bottom slides b of the seed-dropping tube F'. The slides b are so arranged that when one opens the seed-dropping tube F' the other closes the same, which produces alternately the filling and discharging of the tube F'.

When the slide-actuating rod E is engaged by the arm D of the axle, the upper slide b is closed and the lower opened, and thereby the seed discharged; but when the rod E drops on the axle the upper slide is opened and the lower closed, and thereby the filling of the seed-tube produced. A seed-box and dropping mechanism is arranged at both sides of the frame A, to admit the double or single working of the planter. The furrowing-pieces A' are forked in front of the seed-tubes to spread the ground for the dropping of the seed, while the broad wheels cover up the seed. Diametrical marker-rods G are so applied to sliding sleeves of the axle that they mark the exact place where the seed is dropped by entering the ground simultaneously with the dropping of the seed.

A semicircular box, G', below the driver's seat, at the center part of the planter, admits the clear swinging of the marker-rods.

The planter is thrown in or out of gear with the wheels when the revolving arms d are in nearly horizontal position, the marker-rods being thereby also in a position so as not to interfere with the propelling of the planter.

The simple and strong construction of the planter, together with the automatic working of the seed-dropping and marking devices, forms a planter of considerable durability and efficiency.

Having thus described my invention, I claim as new and desire to secure by Letters Patent—

The combination, with an axle, loose wheels, and clutch mechanism, as set forth, of the radial rods D, arranged on sliding clutches, and the curved rods E on the shaft, connected with seed-slide, for the purpose specified.

THOMAS C. YOUNG.

Witnesses:
T. M. DILLMAN,
G. SMALL.